US012691956B2

(12) United States Patent
Peterson et al.

(10) Patent No.: US 12,691,956 B2
(45) Date of Patent: Jul. 28, 2026

(54) TRUCK/TRACTOR-TRAILER SAFETY AND FUEL SAVING DEVICE

(71) Applicants:Mark Peterson, Inver Grove Heights, MN (US); Loren Paul Skarie, Vergas, MN (US); Thomas Albert Blomberg, Yucaipa, CA (US)

(72) Inventors: Mark Peterson, Inver Grove Heights, MN (US); Loren Paul Skarie, Vergas, MN (US); Thomas Albert Blomberg, Yucaipa, CA (US)

( * ) Notice: Subject to any disclaimer, the term of this patent is extended or adjusted under 35 U.S.C. 154(b) by 287 days.

(21) Appl. No.: 18/237,226

(22) Filed: Aug. 23, 2023

(65) Prior Publication Data

US 2024/0067274 A1      Feb. 29, 2024

Related U.S. Application Data

(60) Provisional application No. 63/401,629, filed on Aug. 27, 2022.

(51) Int. Cl.
B62D 35/00 (2006.01)
B62D 25/16 (2006.01)

(52) U.S. Cl.
CPC ......... B62D 35/001 (2013.01); B62D 25/163 (2013.01); B62D 25/168 (2013.01)

(58) Field of Classification Search
CPC .... B62D 25/163; B62D 35/007; B62D 35/00; B62D 35/001; B62D 25/16; B62D 25/182; B62D 25/18; B62D 25/188
See application file for complete search history.

(56) References Cited

U.S. PATENT DOCUMENTS

| | | | | |
|---|---|---|---|---|
| 2,405,262 A | * | 8/1946 | Lindsay | B62D 25/188 280/851 |
| 2,605,119 A | * | 7/1952 | Earnest | B62D 25/184 280/848 |
| 3,095,215 A | * | 6/1963 | Black | B62D 25/188 280/851 |
| 3,219,363 A | * | 11/1965 | Dalsey | B62D 25/188 24/489 |
| 3,726,544 A | * | 4/1973 | Miller | B62D 25/188 280/851 |
| 3,737,176 A | * | 6/1973 | Cobb | B62D 25/188 280/851 |
| 3,778,086 A | * | 12/1973 | Moore | B62D 25/188 280/851 |
| 3,869,617 A | * | 3/1975 | Gaussoin | B62D 25/188 296/180.4 |
| 3,877,722 A | * | 4/1975 | Conner | B62D 25/188 280/154 |
| 3,940,165 A | * | 2/1976 | Sogoian | B62D 25/188 280/851 |

(Continued)

*Primary Examiner* — Robert E Fuller
(74) *Attorney, Agent, or Firm* — Antonio Papageorgiou, Esq; Lombard Geliebter LLP

(57) ABSTRACT

A device configured for installation behind rear wheels of a truck or trailer includes a cross frame pivotally attachable to frame rails, at least one panel holder comprising a structural member having first and second planar portions joined at an angle relative to one another, and at least one panel attached to the panel holder. Bearings, holder straps, and support brackets facilitate attachment of the device to the frame rails.

20 Claims, 7 Drawing Sheets

(56)     References Cited

U.S. PATENT DOCUMENTS

| | | | | |
|---|---|---|---|---|
| 5,564,750 A * | 10/1996 | Bajorek | ............... | B62D 25/188 |
| | | | | 280/848 |
| 5,676,389 A * | 10/1997 | Richardson | .......... | B62D 53/068 |
| | | | | 280/154 |
| 5,915,708 A * | 6/1999 | Silva | .................... | B62D 25/188 |
| | | | | 280/154 |
| 6,079,769 A * | 6/2000 | Fannin | ................. | B62D 35/001 |
| | | | | 296/180.1 |
| 6,786,512 B2 * | 9/2004 | Morin | ................. | B62D 25/188 |
| | | | | 280/847 |
| 7,407,194 B1 * | 8/2008 | Alley | ................... | B62D 25/188 |
| | | | | 280/154 |
| 7,475,911 B2 * | 1/2009 | Edwards | ............. | B62D 25/188 |
| | | | | 280/154 |
| 9,027,983 B2 * | 5/2015 | Butler | ................. | B62D 25/166 |
| | | | | 280/847 |
| 10,300,960 B1 * | 5/2019 | Wingen | ................... | B60D 1/58 |
| 10,421,498 B2 * | 9/2019 | Blomberg | ............ | B62D 25/163 |
| 11,767,064 B2 * | 9/2023 | Urista | ................. | B62D 25/188 |
| | | | | 280/154 |
| 12,358,566 B1 * | 7/2025 | Page | .................... | B62D 25/182 |
| 2002/0056985 A1 * | 5/2002 | Szakurski | ............ | B62D 25/168 |
| | | | | 280/847 |

* cited by examiner

28
FIG. 12
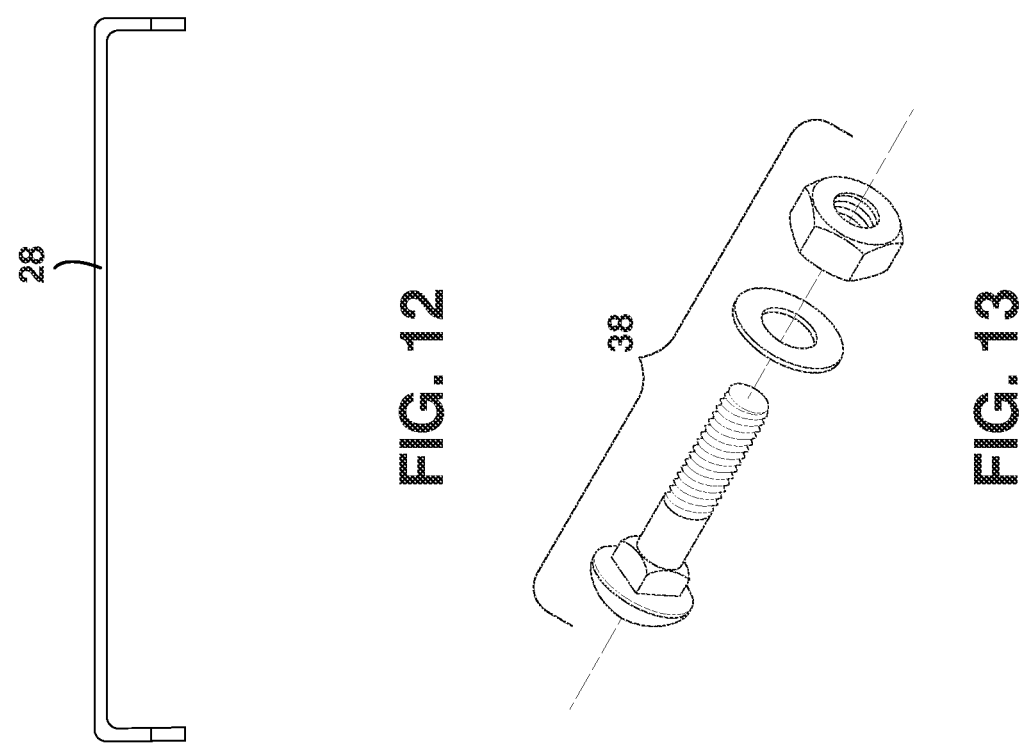
38
FIG. 13
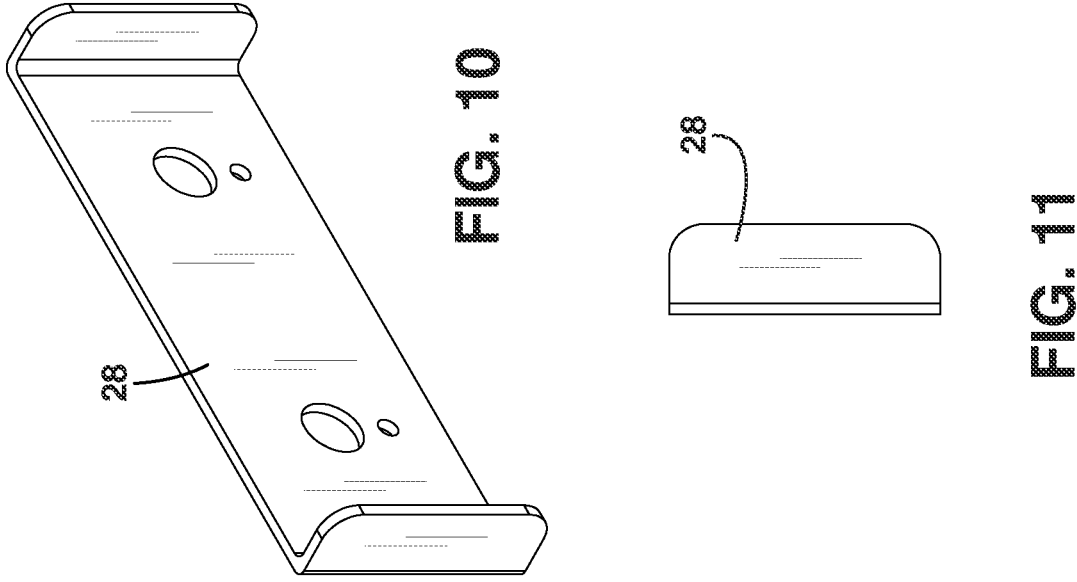
28
FIG. 10
28
28
FIG. 11

40

40

40

TRUCK/TRACTOR-TRAILER SAFETY AND FUEL SAVING DEVICE

RELATED APPLICATION

This application claims the benefit of U.S. (Provisional) Application No. 63/401,629 filed Aug. 27, 2022 which is hereby incorporated herein by reference.

BACKGROUND OF THE INVENTION

The present invention relates to devices affixed to trucks or trailers for improving conditions for vehicles driving behind trucks/trailers and/or improving truck/tractor-trailer aerodynamics in support of fuel savings.

Trucks and tractor-trailers (generally referred to herein as trucks) are staples of commerce. It is estimated that trucks travel 800 billion miles per year, which continues to grow yearly. Trucks, however, create hazards for light duty vehicles traveling behind them. Additionally, even though aerodynamics of the cab have been improved, the bottom of most trucks/trailers is still considered an aerodynamic mess, with landing gear, crossmembers and main beams grabbing at the air and causing troublesome turbulence, ultimately impacting not only the truck/tractor-trailer owner operator, but also vehicles driving behind them. Whiteout conditions, for example, are often caused by trucks/trailers operators driving snow and rain covered roads, impeding trailing vehicles as they manage the wind and other weather conditions.

Accordingly, there is a need for a truck/trailer safety and/or fuel savings device that are not limited as such, for example, which can reduce turbulence underneath and/or behind the truck/trailer, moderating white out conditions and improve aerodynamics saving fuel for the truck/tractor-trailer owner operator.

SUMMARY OF THE INVENTION

A device is installed behind rear wheels of a truck, the truck having a plurality of frame rails with a space between the frame rails and a set of rear wheels positioned below the frame rails. The device includes a cross frame pivotally attached to the frame rails of the truck, at least one panel holder attached to the cross frame, and at least one panel attached to the panel holder, the panel extending laterally between opposing lateral ends of the truck.

In one embodiment, the device includes a pair of bearings installed at opposing lateral ends of the cross frame, the cross frame pivotally attached to the frame rails via the pair of bearings.

In one embodiment, the cross frame comprises a tubular element at the upper end thereof extending laterally between the frame rails.

In one embodiment, the cross frame comprises a holder strap at each lateral end of the cross frame, the holder strap having an adjustable loop at an upper end thereof, the bearings attached to the cross frame via the adjustable loops.

In one embodiment, the cross frame comprises a continuous sheet of material that fills a space between the frame rails.

In one embodiment, the at least one holder angle extends laterally in a cantilever relationship to the cross frame.

In one embodiment, the cross frame is installed between about 30% to about 60% of a distance between the rear tires and a truck bumper.

In one embodiment, the at least one panel has a plurality of slotted holes therein.

In one embodiment, the cross frame comprises a tubular element at the upper end thereof extending laterally between the frame rails, a continuous sheet of material that extends downward from the tubular element, and that terminates at an angle relative to the continuous sheet of material, such that the at least one panel tilts rearward.

In another aspect, a device is provided that is installed behind rear wheels of a truck, the truck having a plurality of frame rails with a space between the frame rails and a set of rear wheels positioned below the frame rails. The device includes: a cross frame pivotally attached to the frame rails of the truck at an upper end of the cross member; at least one panel holder angle attached to the cross member at a lower end of the cross member, the lower end of the cross member opposite the upper end thereof; and at least one panel attached to the at least one panel holder angle, the at least one panel extending laterally entirely between lateral ends of the truck. The cross frame includes a continuous sheet of material that fills a space between the frame rails and wherein the cross frame is installed between about 30% to about 60% of the distance between the rear tires and a truck bumper.

Additional aspects of the present invention will be apparent in view of the description which follows.

BRIEF DESCRIPTION OF THE FIGURES

The invention may be more completely understood in consideration of the following detailed description of various embodiments of the invention in connection with the accompanying drawings, in which:

FIG. 10 is a perspective view of the bearing support bracket;

FIG. 11 is a left side elevation thereof.

FIG. 12 is a top plan view thereof.

FIG. 13 is a perspective view of a fastener assembly.

Figure 1:
FIG. 1 is a perspective view of a truck/trailer safety and/or fuel saving device in the roadworthy position.

While the invention is amenable to various modifications and alternative forms, specifics thereof have been shown by way of example in the drawings and will be described in detail. It should be understood, however, that the intention is not to limit the invention to the particular embodiments described but rather to include all modifications, equivalents, and alternatives.

DETAILED DESCRIPTION OF THE INVENTION

Referring to FIG. 1 through FIG. 16, a truck/tractor-trailer safety and/or fuel saving device 20 is provided, which can reduce turbulence behind, moderating white out conditions, and/or improve aerodynamics, saving fuel for the truck/tractor-trailer owner operator. Typically, there can be a 4% to 11% improvement in fuel savings depending upon geographical and weather conditions. The device 20 is generally attached behind the rear wheels of a truck/trailer, not unlike traditional mudflaps. In contrast to traditional mudflaps, the device 20 is installed at about 28 inches behind the rear most wheels. This distance can vary depending on the overhang behind the rear wheels, from about 12 inches to about 40 inches from the rear wheels. In most instances, the position of the rear wheels of a truck/trailer are of a variable nature and can be adjusted according to the needs of the load requirements. The rear overhang of a truck/trailer can vary as well. So, proportionally the location of the device 20 could be in a range of about 30% to 60% of the distance between the bumper 36 and the rear most end of the tires. It is worth noting that the device 20, because of the location, does not necessarily replace traditional mudflaps. Accordingly, the trailer may have traditional mudflaps installed just behind the rear tires of the truck/trailer, and the device 20 behind the mudflaps, as discussed above.

Device 20 includes one or more panels 40 that extend laterally across substantially all of the rear end of the truck/tractor. The device 20 is preferably hingedly coupled to the frame of the truck/tracker behind the rear wheels, therewith allowing the panels 40 to swing fore and aft. A plurality of panels 40 may be attached fixed in relation to each other so that they swing in this regard as a unit.

In one embodiment, the truck/tractor-trailer safety and/or fuel saving device 20 includes a cross frame 22, panel holder angles 24, panels 40, bearings 32, holder straps 26 and/or bearing support brackets 28 affixed together through a network of, round, square and slotted holes, by fastener assemblies 38 to a trailer frame 34. Cross frame 22 preferably extends laterally across the truck/tractor trailer between frame rails 34, and is pivotally attached at each lateral end thereof to one of the plurality of frame rails 24. The cross frame 22 may be installed fixed relative to the frame rails, for example, so that the panels 40 remain essentially orthogonal to the frame rails 24, or in certain instances so that panels 40 remain pointing rearward.

Figures 2, 3:
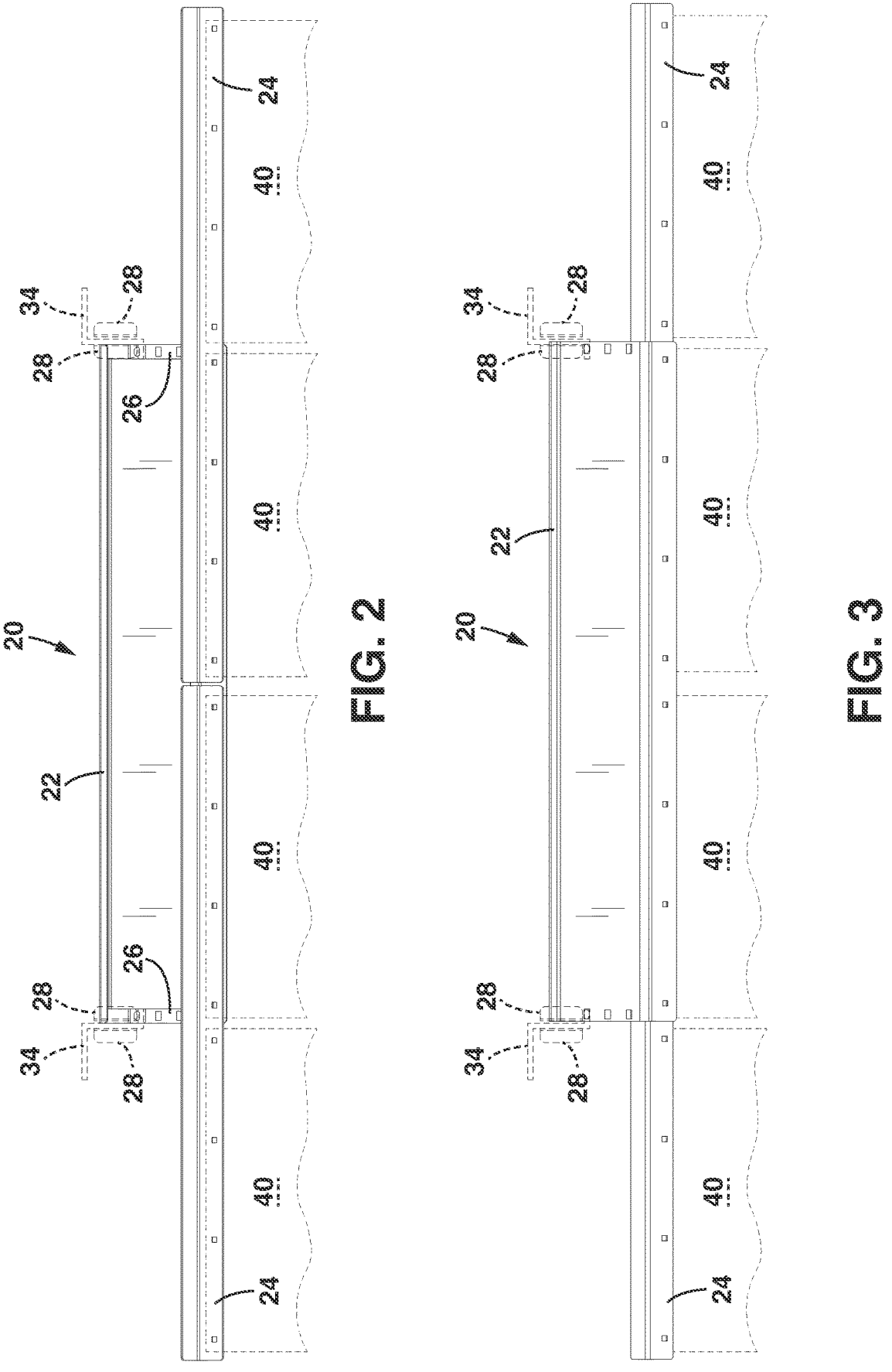
FIG. 2 is a front elevation view of a truck/trailer safety and/or fuel saving device.
FIG. 3 is a rear elevation view thereof.
Figures 4, 5:
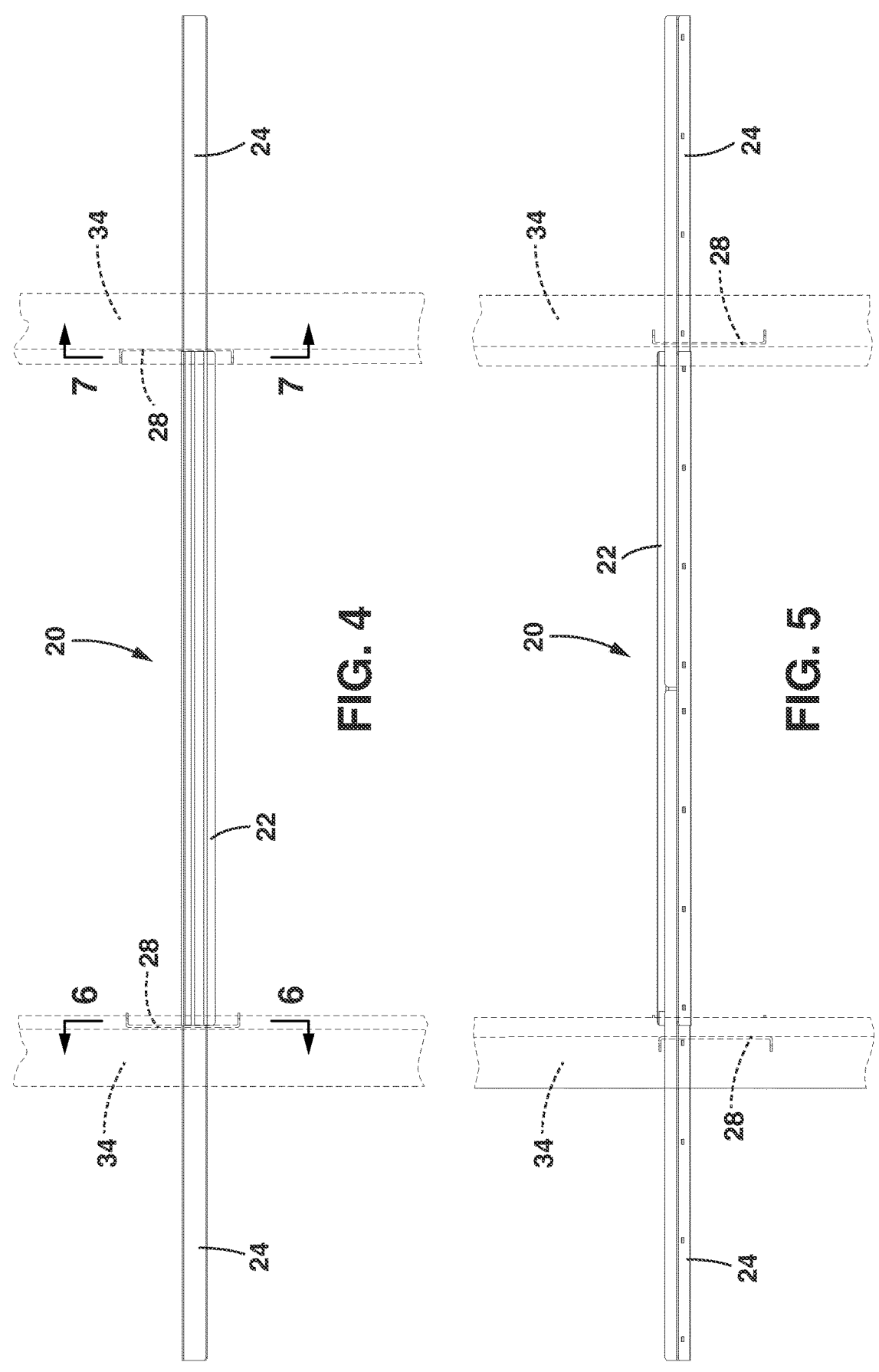
FIG. 4 is a top plan view thereof.
FIG. 5 is a bottom plan view thereof.

Cross frame 22 is preferably made from a continuous sheet of material that fills the space between frame rails 24 and limits/prevents air flow between these frame rails 34, as shown in FIG. 2. An element spanning laterally may be included as a part of cross frame 22 for rigidity, such as the semi-tubular or tubular element shown in FIG. 1 at the top end of cross frame 22. The bearings 32 may be affixed to each of the tubular ends of cross frame 22, as shown. Holder angles 24 may be attached along the bottom end of cross frame 22, which may provide the structure for retaining panels 40. In one embodiment, a pair of holder angles 24 are attached in a cantilever relationship to cross frame 22, as shown in FIG. 2. At least one embodiment is described in the descriptions herein. Of course, other embodiments can also be construed and constructed from this disclosure without departing from the inventive nature thereof.

The cross frame 22 as referenced in FIG. 1 through FIG. 7 is preferably made of A653, G90 galvanized steel measuring about 0.11 inches in thickness by about 48 inches in length. This length can be incrementally adjusted to fit within varying dimensions 48 of a truck/trailer frame 34 and is bent from one continuous sheet to the profile as shown in the drawings. In another embodiment a cross frame 22 can extend beyond a truck/trailer frame 34 to the outermost edges of a trailer's sides.

The panel holder angle 24 as referenced in FIG. 1 through FIG. 7 is preferably made of A653, G90 galvanized steel measuring about 0.14 inches in thickness by about 48 inches in length and measures about 2 inches wide at each of its sides, angled at about 100 degrees to one another.

The panel 40 as referenced in FIG. 1, FIG. 6, FIG. 7, FIG. 14, FIG. 15, and FIG. 16 is preferably made of polypropylene, or other suitable material for a panel 40, measuring about 24 inches wide by about 27 tall by about 0.25 inches thick. Containing about four 0.375 inch slotted holes for mounting purposes and a multitude of slotted holes measuring about 0.125" by about 2.5 inches in length continuously cut through panel 40. In other embodiments widths could be about 18 inches and lengths could vary from about 24 inches to about 36 inches. In other embodiments various shaped holes of a multitude of various configurations can be present in a panel 40.

The sealed bearing 32 as referenced in FIG. 1 through FIG. 7 preferably measures about 1½ inches in diameter by one and a half inches in thickness with its center accommodating about a 0.625 inch hex bolt for fastening purposes and is rated for about 2 tons of side load at 3600 revolutions per minute. The bearing 32 is held to the cross member 22 via a holder strap 26.

Figures 6, 7:
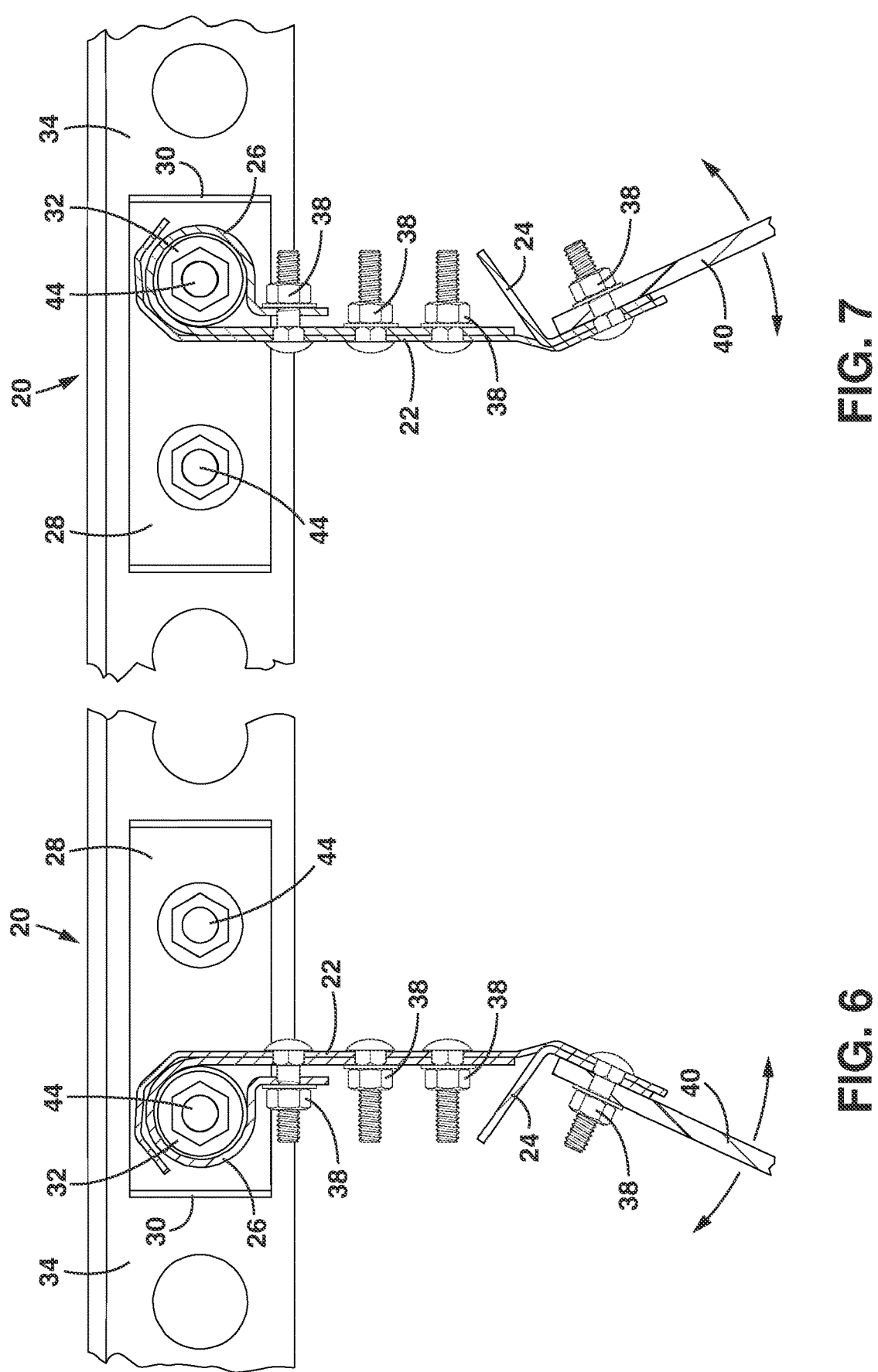
FIG. 6 is a section view taken from FIG. 4.
FIG. 7 is a section view taken from FIG. 4.

The holder strap 26 as referenced in FIG. 1 through FIG. 7 is preferably made of A653, G90 galvanized steel measuring about 0.14 inches in thickness by about 1 inch wide and is bent from one continuous sheet to the profile as shown in the drawings, to accommodate the securing of about a 1.5 inch bearing 32. Holder strap 26 has an adjustable loop at the upper end thereof that is tightened around the bearing 32, as shown in FIGS. 6 and 7. The loop of holder strap 26 extends downward and has a plurality of vertically spaced holes therein for attaching the holder strap 26 to the cross member 22, as shown. As can be seen, cross member 22 terminates at an angle, so that panels 40 can be installed tilting rearward, as discussed above.

Figures 8, 9:
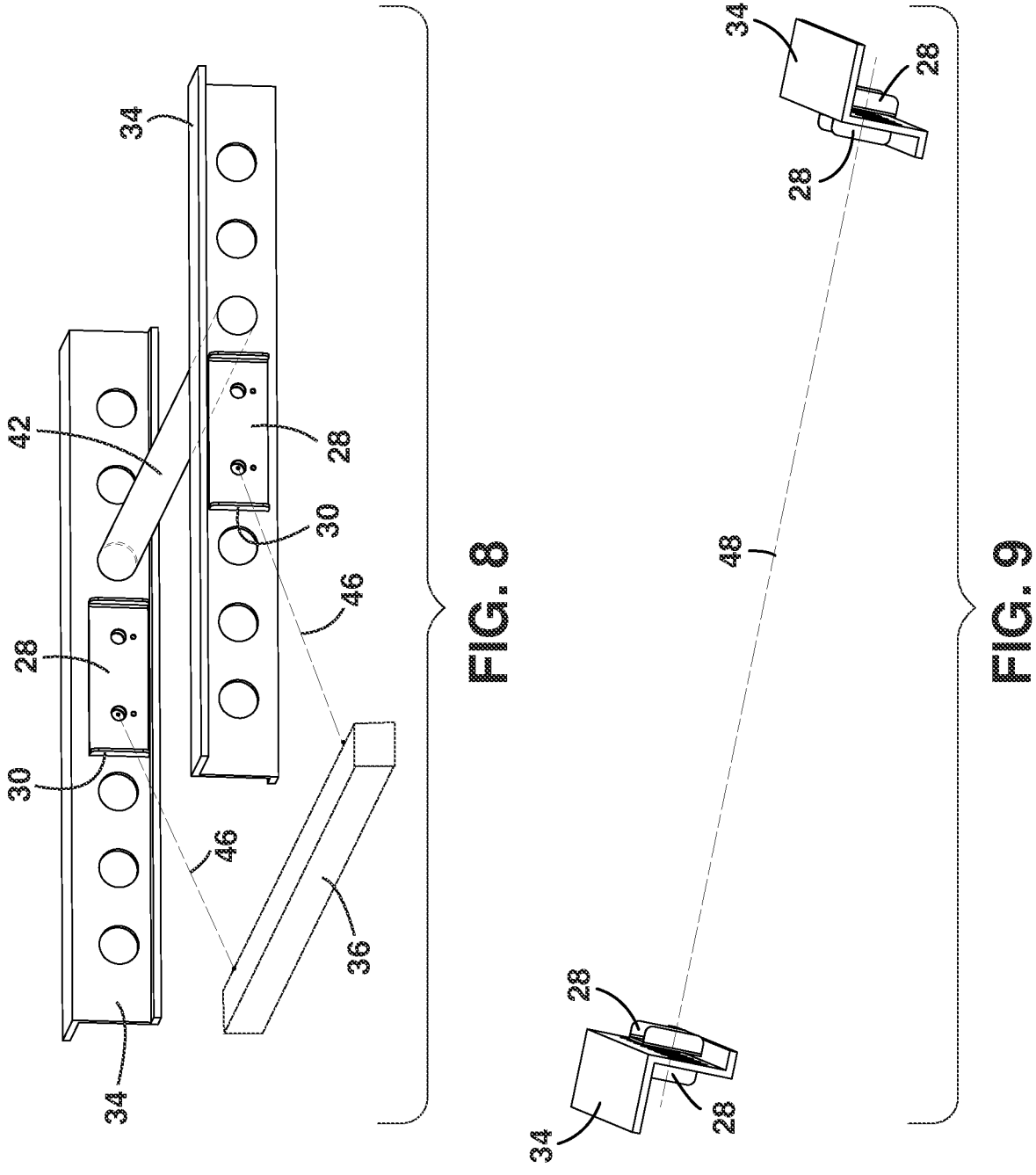
FIG. 8 is a perspective view of a portion of a typical trailer frame relating to the installation of a truck/trailer safety and/or fuel saving device.
FIG. 9 is a perspective view of a portion of a typical trailer frame relating to the bearing support bracket alignment for a truck/trailer safety and/or fuel saving device.
Figures 14, 15, 16:
FIG. 14 is a front elevation view of a panel.
FIG. 15 is a top plan view thereof.
FIG. 16 is a side elevation view thereof.

The bearing support bracket 28 as referenced in FIG. 1 through FIG. 7 and FIG. 10 through 12 is preferably made of A653, G90 galvanized steel measuring about 0.14 inches in thickness and is bent from a sheet measuring about 3 inches wide by about 9.53 inches long with two upset ends measuring about 1 inch wide by 3 inches long. At least one of the two upset ends become a bearing stop 30 to protect a truck/trailer safety and/or fuel saving device 20 from a rear impact force such as a rearward moving wheel carriage. Two 0.026 inch aligning holes may be punched on centers about 4 inches on center from one another. Two adjacent 0.26 inch holes may be punched accordingly about 0.75 inch to the side of the aligning holes. The 0.26 inch hole may be used for installation means when fitting a truck/trailer safety and/or fuel saving device 20 to a trailer frame 34. The bearing support bracket 28 is installed on frame rail 34 at the desired location, as discussed herein. A plurality of bearing support brackets 28 may be installed with the frame rail 34 in between them, as shown in FIG. 9. The bearing support brackets 28 have holes therein smaller than the holes in the frame rail 34 and sized to be clamped together via fastener assemblies 44.

The fastener assembly 38 as referenced in FIG. 13 is preferably a carriage bolt about 0.375 inch grade 3, the length is about 1.5 inches, having a matched size flat washer and hex nut. There may be about 16 bolts holding the panels 40 and panel holder angles 24, four for each panel 40. About four more fastener assemblies 38 hold the bearing support brackets 28 to a cross frame 22 and about two more fastener assemblies 38 hold the bearings 32 in place in the bearing support brackets 28. All as referenced in FIG. 6 and FIG. 7. Carriage bolts and square holes may be used to install a truck/trailer safety and/or fuel saving device 20 because their smooth heads aid airflow and there installation is eased by not needing two wrenches to tighten fastener assemblies 38.

Other fastener assemblies 44 are preferably made of about four 0.625 inch hex bolts grade 8, the length is about 2 inches for fastening the bearing 40, bearing support bracket 28 to the trailer frame 34 as referenced in FIG. 6 and FIG. 7.

The truck/trailer frame 34 and rear bumper 36 as referenced in FIGS. 2 through 9 are representative of conventional construction for truck/trailers, particularly as illustrated in FIGS. 8 and 9. A truck/trailer safety and/or fuel saving device 20 is initially installed according to an angular measurement 46 of about 36 inches from the rear bumper 36 of a truck/trailer to about the first available hole in the truck/trailer frame 34. To position the truck/trailer safety and/or fuel saving device 20, the installer begins by locating the rear bumper 36 of the truck/trailer, which is typically found at a lower level behind the truck/trailer frame 34. Truck/trailer frames 34 are typically constructed in the fashion of a beam with upset edges and holes punched at about 4 inches on center. Because these holes are used for installation purposes, the installer takes an angular measurement 46 from the rear bumper 36, preferably about 36 inches, to locate the first available hole in the frame 34 at that distance. This location provides an installation point for the bearing support brackets 28 to be installed on each side of the truck/trailer frame 34, secured by fastener assemblies 44, thereby supporting the bearings 32 and the remainder of the truck/trailer safety and/or fuel saving device 20 assembly.

The stop bar 42 as referenced in FIG. 8 is preferably made of a steel bar with a circular or other shaped cross section measuring about 50 inches in length and secured to a trailer frame 34 to protect a truck/trailer safety and/or fuel saving device 20 from a rear impact force such as a rearward moving wheel carriage.

While the foregoing invention has been described in some detail for purposes of clarity and understanding, it will be appreciated by one skilled in the art, from a reading of the disclosure, that various changes in form and detail can be made without departing from the true scope of the invention.

What is claimed is:

1. A device installed behind rear wheels of a truck, the truck having a plurality of frame rails with a space between the frame rails and a set of rear wheels positioned below the frame rails, the device comprising:
   a cross frame pivotally attached to the frame rails of the truck at an upper end of the cross member;
   at least one panel holder comprising a structural member having first and second planar portions joined at an angle relative to one another attached to the cross member at a lower end of the cross member, the lower end of the cross member opposite the upper end thereof; and
   at least one panel attached to the at least one panel holder, the at least one panel extending laterally from one lateral end of the truck to an opposing lateral end of the truck.

2. The device of claim 1, further comprising a pair of bearings installed at opposing lateral ends of the cross frame, the cross frame pivotally attached to the frame rails via the pair of bearings.

3. The device of claim 2, wherein the cross frame comprises a tubular element at the upper end thereof extending laterally between the frame rails.

4. The device of claim 3, wherein the cross frame comprises a holder strap at each lateral end of the cross frame, the holder strap having an adjustable loop at an upper end thereof, the bearings attached to the cross frame via the adjustable loops.

5. The device of claim 1, wherein the cross frame comprises a continuous sheet of material that fills a space between the frame rails.

6. The device of claim 1, wherein the at least one panel holder angle extends laterally in a cantilever relationship to the cross frame.

7. The device of claim 1, wherein the cross frame is installed between about 30% to about 60% of a distance between the rear tires and a truck bumper.

8. The device of claim 1, wherein the at least one panel has a plurality of slotted holes therein.

9. The device of claim 1, wherein the cross frame comprises a tubular element at the upper end thereof extending laterally between the frame rails, a continuous sheet of material that extends downward from the tubular element, and that terminates at an angle relative to the continuous sheet of material, such that at least one panel tilts rearward.

10. A device installed behind rear wheels of a truck, the truck having a plurality of frame rails with a space between the frame rails and a set of rear wheels positioned below the frame rails, the device comprising:
   a cross frame pivotally attached to the frame rails of the truck at an upper end of the cross member;
   at least one panel holder comprising a structural member having first and second planar portions joined at an angle relative to one another attached to the cross member at a lower end of the cross member, the lower end of the cross member opposite the upper end thereof; and
   at least one panel attached to the at least one panel holder, the at least one panel extending laterally from one lateral end of the truck to an opposing lateral end of the truck, wherein the cross frame comprises a continuous sheet of material that fills a space between the frame rails and wherein the cross frame is installed between about 30% to about 60% of a distance between the rear tires and a truck bumper.

11. The device of claim 10, further comprising a pair of bearings installed at opposing lateral ends of the cross frame, the cross frame pivotally attached to the frame rails via the pair of bearings.

12. The device of claim 10, wherein the cross frame comprises a tubular element at the upper end thereof extending laterally between the frame rails.

13. The device of claim 10, wherein the cross frame comprises a holder strap at each lateral end of the cross frame, the holder strap having an adjustable loop at an upper end thereof, the bearings attached to the cross frame via the adjustable loops.

14. The device of claim 10, wherein the at least one panel holder angle extends laterally in a cantilever relationship to the cross frame.

15. The device of claim 10, wherein the at least one panel has a plurality of slotted holes therein.

16. The device of claim 10, wherein the cross frame comprises a tubular element at the upper end thereof extending laterally between the frame rails, a continuous sheet of material that extends downward from the tubular element, and that terminates at an angle relative to the continuous sheet of material, such that at least one panel tilts rearward.

17. A device installed behind rear wheels of a truck, the truck having a plurality of frame rails with a space between the frame rails and a set of rear wheels positioned below the frame rails, the device comprising:

a cross frame pivotally attached to the frame rails of the truck at an upper end of the cross member, wherein the cross frame comprises a tubular element at the upper end thereof extending laterally between the frame rails;

at least one panel holder comprising a structural member having first and second planar portions joined at an angle relative to one another attached to the cross member at a lower end of the cross member, the lower end of the cross member opposite the upper end thereof; and at least one panel attached to the at least one panel holder, the at least one panel extending laterally from one lateral end of the truck to an opposing lateral end of the truck, wherein the cross frame comprises a continuous sheet of material that fills a space between the frame rails and wherein the cross frame is installed between about 30% to about 60% of a distance between the rear tires and a truck bumper, wherein the cross frame comprises a holder strap at each lateral end of the cross frame, the holder strap having an adjustable loop at an upper end thereof, the bearings attached to the cross frame via the adjustable loops.

18. The device of claim 17, further comprising a pair of bearings installed at opposing lateral ends of the cross frame, the cross frame pivotally attached to the frame rails via the pair of bearings.

19. The device of claim 17, wherein the at least one panel holder extends laterally in a cantilever relationship to the cross frame.

20. The device of claim 17, wherein the cross frame comprises a tubular element at the upper end thereof extending laterally between the frame rails, a continuous sheet of material that extends downward from the tubular element, and that terminates at an angle relative to the continuous sheet of material, such that at least one panel tilts rearward.

* * * * *